United States Patent
Shiuan et al.

(10) Patent No.: US 6,919,899 B2
(45) Date of Patent: Jul. 19, 2005

(54) CONTINUOUS GRAPHICS DISPLAY FOR SINGLE DISPLAY DEVICE DURING THE PROCESSOR NON-RESPONDING PERIOD

(75) Inventors: Yi-Fang Michael Shiuan, Saratoga, CA (US); Xinwei Yang, Fremont, CA (US); Jinming Gu, Cupertino, CA (US); Iming Pai, San Jose, CA (US)

(73) Assignee: Via Technologies, Inc., Taipei Hsien (TW)

( * ) Notice: Subject to any disclaimer, the term of this patent is extended or adjusted under 35 U.S.C. 154(b) by 174 days.

(21) Appl. No.: 10/640,493

(22) Filed: Aug. 12, 2003

(65) Prior Publication Data

US 2004/0075653 A1 Apr. 22, 2004

Related U.S. Application Data

(60) Provisional application No. 60/419,880, filed on Oct. 19, 2002.

(51) Int. Cl.$^7$ ................................................. G06T 1/60
(52) U.S. Cl. ...................... 345/530; 345/211; 345/213; 713/320
(58) Field of Search ................................ 345/530, 204, 345/211–213; 713/300, 320–323; 714/340

(56) References Cited

U.S. PATENT DOCUMENTS 5,861,879 A * 1/1999 Shimizu et al. ............. 345/213
6,067,083 A * 5/2000 Glen et al. .................. 345/213

* cited by examiner

Primary Examiner—Kee M. Tung
Assistant Examiner—Mackly Monestime
(74) Attorney, Agent, or Firm—J.C. Patents

(57) ABSTRACT

An uninterrupted data display method for a computer system having a system memory directly accessed by a processor, for preventing disrupted data display from transmission break is disclosed. The method is accomplished before the processor goes into a non-responding period due to an execution of an economical process. The method includes the steps of: (i) providing a data storage device having a depth for storing a period long of data. (ii) Comparing the period of said depth to the non-responding period, if the period of said depth is longer than the non-responding period, jump to step (iii), otherwise, to step (iv). (iii) Loading the period long of data from a system memory into the data storage device then jump to step (v). (iv) Detecting a synchronization pulse then jump to step (v), wherein step (v) is to be accomplished within a non-display period, and, (v) executing the economical process.

25 Claims, 6 Drawing Sheets

CONTINUOUS GRAPHICS DISPLAY FOR SINGLE DISPLAY DEVICE DURING THE PROCESSOR NON-RESPONDING PERIOD

CROSS-REFERENCE TO RELATED APPLICATION

This application claims the priority benefits of U.S. provisional application titled" "Uninterrupted Graphics Display During The Period of Adjusting Processor's Operating Frequency And Power" filed on Oct. 19, 2002, Ser. No. 60/419,880. All disclosure of this application is incorporated herein by reference.

BACKGROUND OF THE INVENTION

1. Field of the Invention

The present invention relates to computer monitor display, and more particularly, to a method for continuously displaying graphics or video data during a non-responding period of a central processing unit (CPU). Herein, the graphics or video data are stored in a system memory that can only be accessed via an embedded memory controller inside the processor.

2. Description of the Prior Art

Graphics-intensive applications for computers such as personal computers (PC's) are becoming increasingly more popular. Such applications include high-end computer-aided drafting (CAD) applications, a multimedia game, MPEG (Moving Picture Experts Group) video playback, video conferencing, or one of many other real-time video applications. As these applications become more complex, they require the computers on which they are run to render and execute graphics much more quickly. Furthermore, as the typical resolution of computer screens has increased from 640.times.480 pixels (horizontal.times.vertical) to 800.times.600, 1024.times.768, 1280.times.1024 and beyond, and increased color information per pixel from two bits to 24 bits to 32 bits and beyond, the processing demand placed on the computers for fast graphics execution has also grown.

The typical computer relies on a graphics processing unit or a standalone graphics card, GFX, (also known as a video card, graphic accelerator card, or a display adapter, among other terms) to assist it in the display of graphics data on a display device. A graphics card generally includes a specialized processor or processors that are tailor-made for graphics rendering, as well as an amount of memory, ranging from one, two, four, eight, sixteen megabytes and up, so that a complete screen of graphics information, known as a frame, can be stored by the graphics card. This memory is generally known as a frame buffer of the graphics card.

Now please refer to FIG. 1 for a discrete-type computer system 10, which comprises a central processing unit (CPU) 11, a system chipset (commonly referred to as the north bridge, NB) 12, a datapath chipset (commonly referred to as the south bridge, SB) 13, a system memory 14, a graphics card (GFX) 15, a frame buffer 16, a display device 17 (such as a cathode ray tube, CRT, or a flat-panel type) and a built-in memory controller 18 inside the north bridge 12. Graphics "cards", the graphics processing unit, may also be integrated within a single chip or into a chipset (such as the north bridge) on a motherboard of a computer. Please refer to FIG. 2 of such an integrated-type computer system 20, which comprises a CPU 21, a north bridge (NB) 22, a south bridge (SB) 23, a system memory 24 and a display device 25. The north bridge 22 has a built-in memory controller 26 and an integrated graphics processing unit (GFX) 27.

Graphics information to be displayed on the display device, such as cathode ray tube (CRT) or liquid crystal display (LCD), is stored in the system memory in preparation to being transferred to a video memory of the first-in-first-out (FIFO) type. The display FIFO of a graphics card requests system memory access, and may be envisioned as a storage tank of water (data) draining at a uniform rate from the bottom, and only occasionally being refilled from the top. The graphics card of the discrete-type computer system (shown in FIG. 1) or the graphics processing unit of the integrated-type computer system (shown in FIG. 2) can request access to the system memory directly through the memory controller in the north bridge (NB). In other words, the system memory access is requested by the graphics processing unit (or the graphics card) without going through the CPU.

Nevertheless, the computer system architectures shown in FIGS. 1 and 2 are not the only two system architectures that are in use, there are a few others, two examples of such other computer system architectures are shown in FIGS. 3 and 4. The computer system architecture 30 of FIG. 3 is similar to the discrete-type computer system 10 of FIG. 1, comprising a CPU 31, a north bridge (NB) 32, a south bridge (SB) 33, a system memory 34, a graphics card (GFX) 35, a frame buffer 36 and a display device 37, but also a built-in memory controller 38 inside the CPU 31. The computer system architecture 40 of FIG. 4 is similar to the integrated-type computer system 20 of FIG. 2, comprising a CPU 41, a north bridge (NB) 42, a south bridge (SB) 43, a system memory 44, a display device 45 and an integrated graphics processing unit (GFX) 47 in the north bridge 42, but also a built-in memory controller 46 in the CPU 41. The main differences between the computer system architectures of FIGS. 3 and 4 and the computer system architectures of FIGS. 1 and 2 are the placements of the memory controller and the system memory. The memory controller is integrated into the CPU in the computer system architectures of FIGS. 3 and 4, wherein the system memory is coupled to the CPU via the built-in memory controller. That is, the system memory access requested by the graphics processing unit (or the graphics card) has to go through not only the north bridge but the CPU as well.

Increased processor performance has often meant increased power consumption and shorter battery life (for mobile processor-based notebooks or lap tops). Power saving technique is a solution available now in most of the computer systems. When a state where an application program waits for input and a state where there is no input from an input device are continued for a predetermined time period, the supply of a clock from a CPU and the supply of power is stopped. Moreover, some applications require less processing power than others, the power saving technique can control the level of processor performance, dynamically adjusting the operating frequency and voltage many times per second, according to the task on hand. As a result, the power consumption is reduced, to extend the operating time of the batteries or reduce the battery capacity.

Nevertheless, the power saving technique often requires a period of a few $\mu$sec up to tens of $\mu$sec to process, so as to reduce the operating frequency. During that period (power saving process period), the CPU is in a complete idle state waiting for the alternation of the operating frequency. The graphics processing unit (or the graphics card) in the computer system architectures of FIGS. 3 and 4, or any architecture having the system memory directly coupled to the CPU, will not be able to request for system memory access through the CPU during the power saving process period.

That is, no data can be obtained by the graphics processing unit (or the graphics card) to be displayed on the display device during that period.

SUMMARY OF THE INVENTION

In accordance with the present invention, an uninterrupted data display method for a computer system having a system memory directly accessed by a processor is provided that substantially prevents disrupted data display from transmission break, before the processor goes into a non-responding period due to an execution of an economical process. In one embodiment, the method of the present invention comprises the steps of: (i) comparing a non-responding period to a horizontal synchronization pulse width, if the non-responding period is shorter than the horizontal synchronization pulse width, jump to step (ii), otherwise, to step (iii). (ii) Detecting the horizontal synchronization pulse or a vertical synchronization pulse, whichever comes first, then jump to step (iv) which is being executed within a horizontal blank period when the horizontal synchronization pulse is detected first, otherwise, a vertical blank period is used for step (iv) if the vertical synchronization pulse is detected before the horizontal synchronization pulse. (iii) Detecting only the vertical synchronization pulse then jump to step (iv), the vertical blank period is used for step (iv) once the vertical synchronization pulse is detected, and, (iv) executing the economical process.

In another embodiment, the method of the present invention comprises the steps of: (i) detecting an initiation of a power saving process. (ii) Obtaining a first length of time required for executing the power saving process and a second length of time of a horizontal synchronization pulse. (iii) Providing a data storage device having a depth for storing a third length of time long of data. (iv) Comparing the third length of time to the first length of time, if the third length of time is longer than the first length of time, jump to step (v), otherwise, to step (vi). (v) Loading the first length of time long of data from the system memory into the data storage device then jump to step (ix). (vi) Comparing the second length of time to the first length of time, if the second length of time is longer than the first length of time, jump to step (vii), otherwise, to step (viii). (vii) Detecting the horizontal synchronization pulse or a vertical synchronization pulse, whichever comes first, then jump to step (ix) which is being executed within a horizontal blank period when the horizontal synchronization pulse is detected first, otherwise, a vertical blank period is used for step (ix) if the vertical synchronization pulse is detected before the horizontal synchronization pulse. (viii) Detecting only the vertical synchronization pulse then jumping to step (ix), the vertical blank period is used for step (ix) once the vertical synchronization pulse is detected, and, (ix) executing said power saving process.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings.

DESCRIPTION OF THE PREFERRED EMBODIMENT

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

A computer typically relies on a graphics processing unit or a graphics card, GFX, to assist it in the display of graphics on a display device. A graphics card generally includes a specialized processor or processors that are tailor-made for graphics rendering, as well as an amount of memory, ranging from one, two, four, eight, sixteen megabytes and up, so that a complete screen of graphics information, known as a frame, can be stored by the graphics card. This memory is generally known as a frame buffer of the graphics card. Please refer back to FIG. 1 for a discrete-type computer system. Graphics "cards", or the graphics processing unit, may also be integrated within a single chip or into a chipset (such as a north bridge, NB) on a motherboard of a computer. Please refer to FIG. 2 of such an integrated-type computer system.

Graphics information to be displayed on the display device, such as cathode ray tube (CRT) or flat panel display, is stored in the system memory in preparation to being transferred to a video memory of the first-in-first-out (FIFO) type. The display FIFO of a graphics card requests system memory access, and may be envisioned as a storage tank of water (data) draining at a uniform rate from the bottom, and only occasionally being refilled from the top. The graphics card of the discrete-type computer system or the graphics processing unit of the integrated-type computer system can request access to the system memory directly through the memory controller in the north bridge (NB). In other words, the system memory access is requested by the graphics processing unit (or the graphics card) without going through the CPU.

Figure 1:
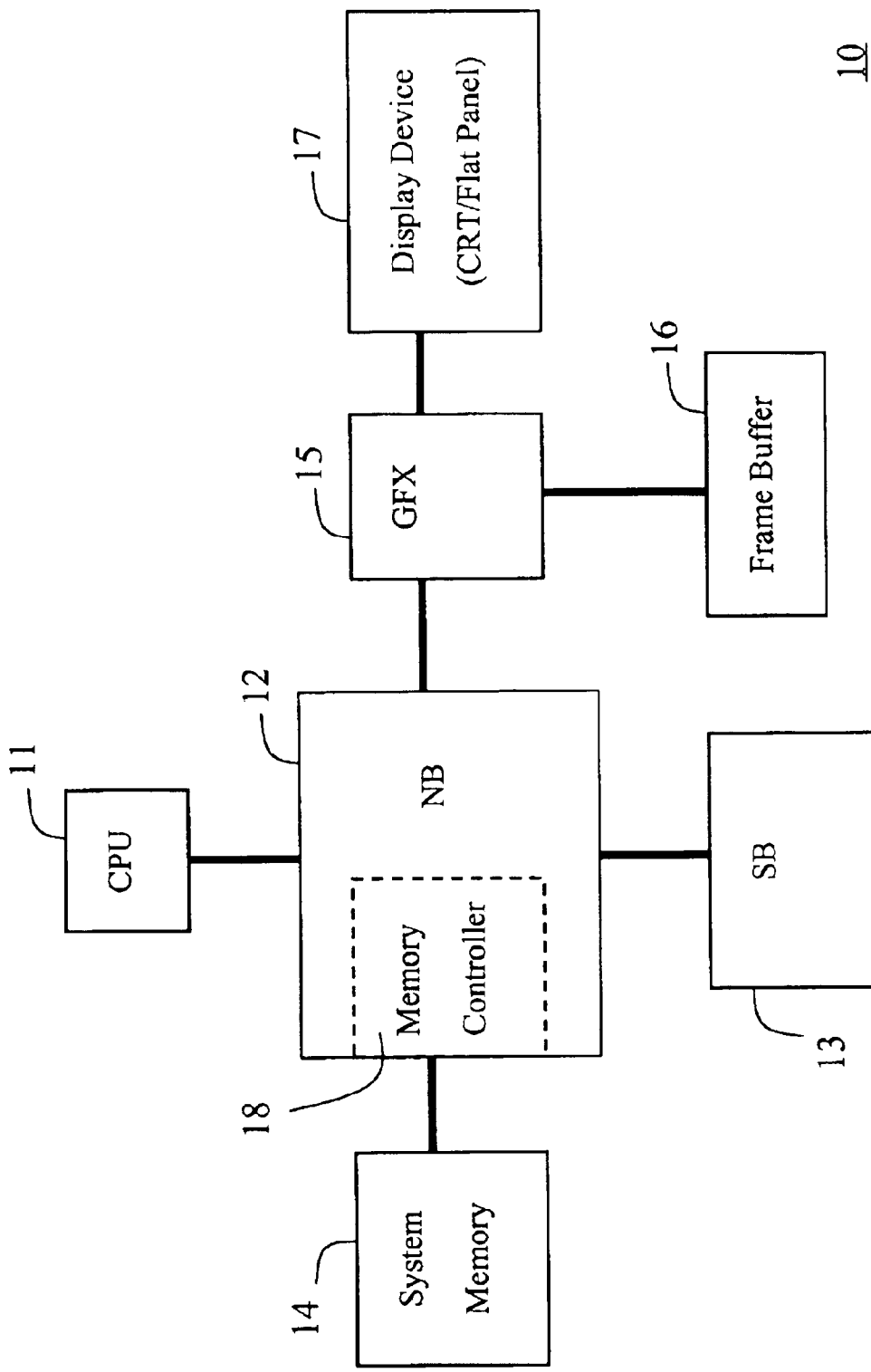
FIG. 1 is a block diagram showing a conventional discrete-type computer system.
Figure 2:
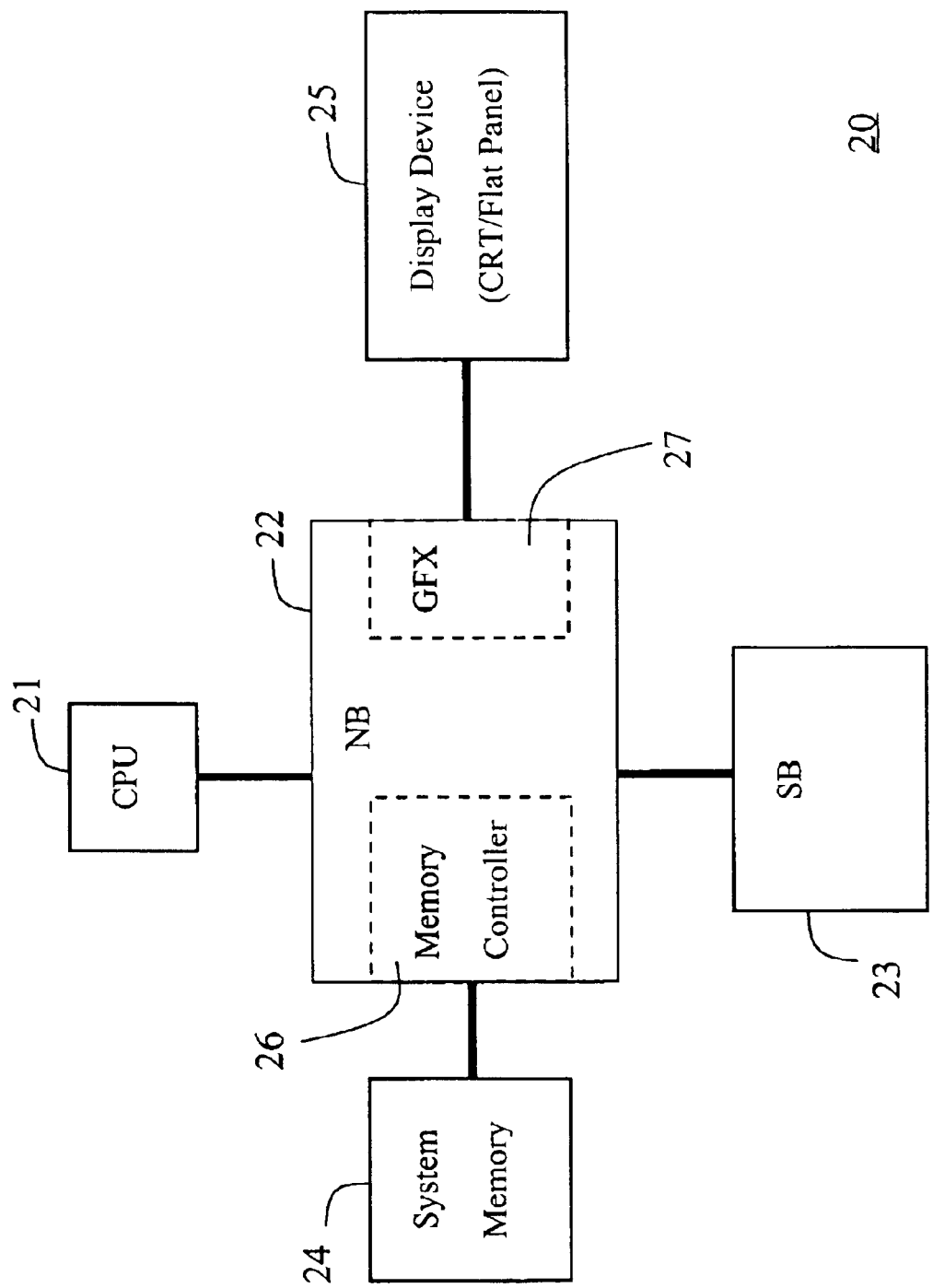
FIG. 2 is a block diagram showing a conventional integrated-type computer system.
Figure 3:
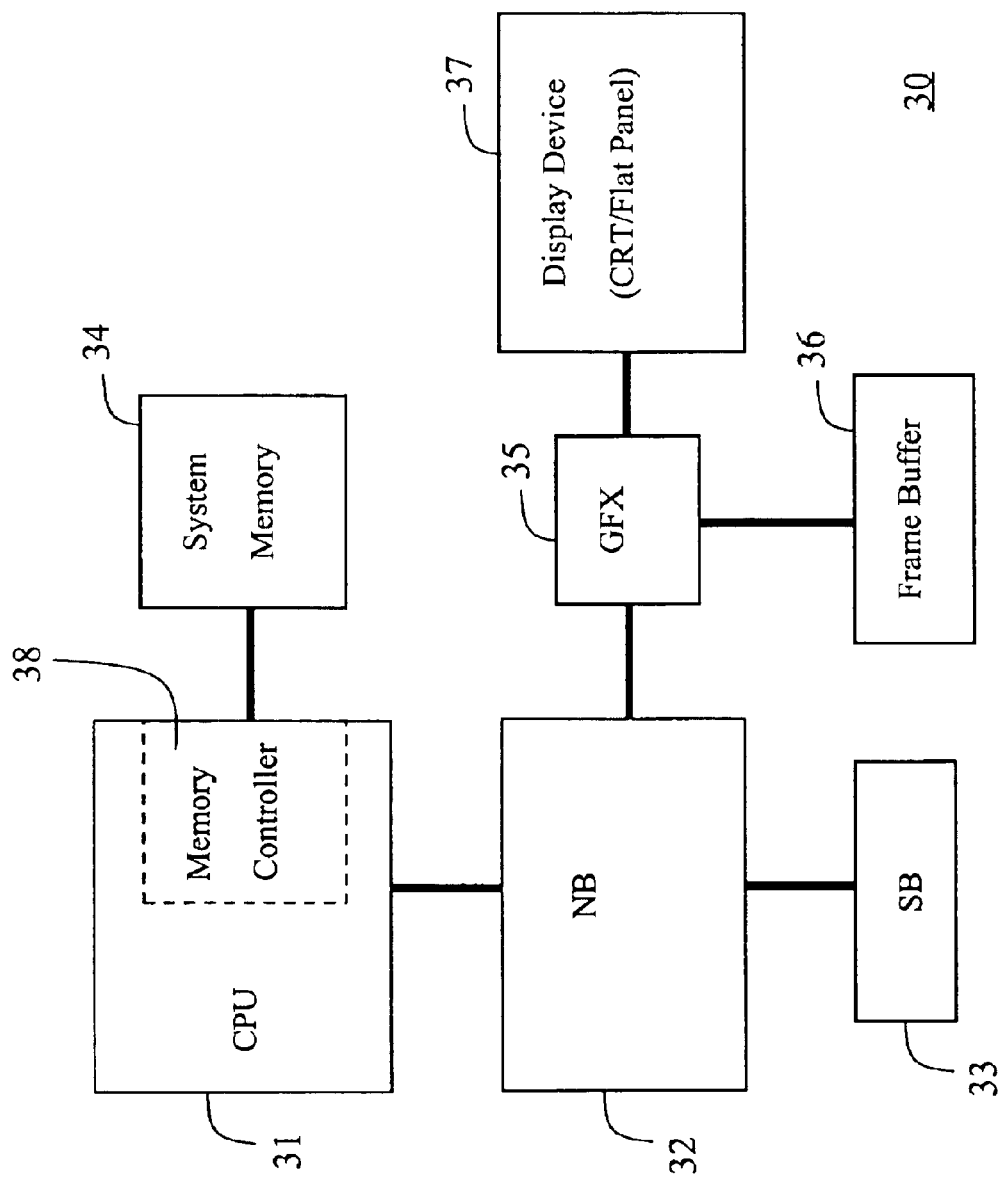
FIG. 3 is a block diagram showing another conventional discrete-type computer system to be applied by the present invention.
Figure 4:
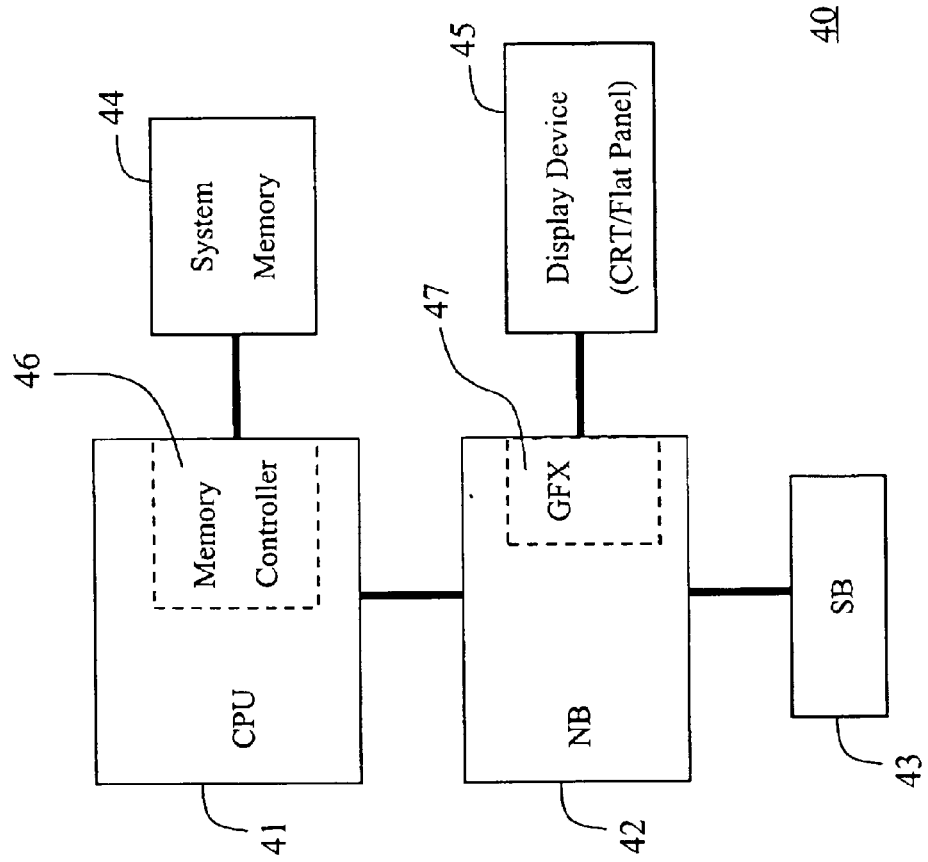
FIG. 4 is a block diagram showing another conventional integrated-type computer system to be applied by the present invention.

Nevertheless, the computer system architectures shown in FIGS. 1 and 2 are not the only two system architectures that are in use, there are a few others, two examples of such other computer system architectures are shown in FIGS. 3 and 4. The main differences between the computer system architectures of FIGS. 3 and 4 and the computer system architectures of FIGS. 1 and 2 are the placements of the memory controller and the system memory. The memory controller is integrated into the CPU in the computer system architectures of FIGS. 3 and 4, wherein the system memory is directly coupled to the CPU via the built-in memory controller. That is, the system memory access requested by the graphics processing unit (or the graphics card) has to go through not only the north bridge but the CPU as well.

The uninterrupted data display method of the present invention for preventing disrupted data display from transmission break, before the processor goes into a non-responding period, is applicable to any computer system having a system memory directly coupled to a processor, such as the computer system architectures of FIGS. 3 and 4 or the like. The computer system architectures of FIG. 3 or FIG. 4 or the like typically comprise a processor, a north bridge, a south bridge, a memory controller, a system memory, a display device, a graphics unit (which can either be a graphics card, a graphics chip mounted to a motherboard or a graphics processing unit integrated into the north bridge), and others. The processor (really a short form for microprocessor and also often called the CPU or central processing unit) is the central component of the PC. The CPU consists of the control unit, the arithmetic logic unit (ALU) and memory (register, cache, RAM and ROM) as well as various temporary buffers and other logic. The control unit fetches instructions from memory and decodes them to produce signals which control the other part of the computer. This may cause it to transfer data between memory and ALU or to activate peripherals to perform input or output. The north bridge is a system control chipset, responsible for integrating the cache and for managing the host and PCI buses. The south bridge is a peripheral bus control chipset, responsible for implementing a PCI-to-ISA bridge function and for managing the ISA bus and all the ports. The system memory is the working memory of the computer, it is used for storing data (including graphics/video data) temporarily while working on it, running application programs, etc. The memory the operating system uses, can be a Rambus DRAM, SDR DRAM, DDR SDRAM, DDR SGRAM or any other types of RAM. The memory controller is an essential component in any computer. Its function is to oversee the movement of data into and out of main memory. It also determines what type of data integrity checking, if any, is supported. The display device is normally in one of two types: flat panel display, a thin display screen that uses any of a number of technologies, such as LCD, plasma and FED, or a cathode ray tube (CRT), the tube of a television or monitor in which rays of electrons are beamed onto a phosphorescent screen to produce images.

Figure 5:
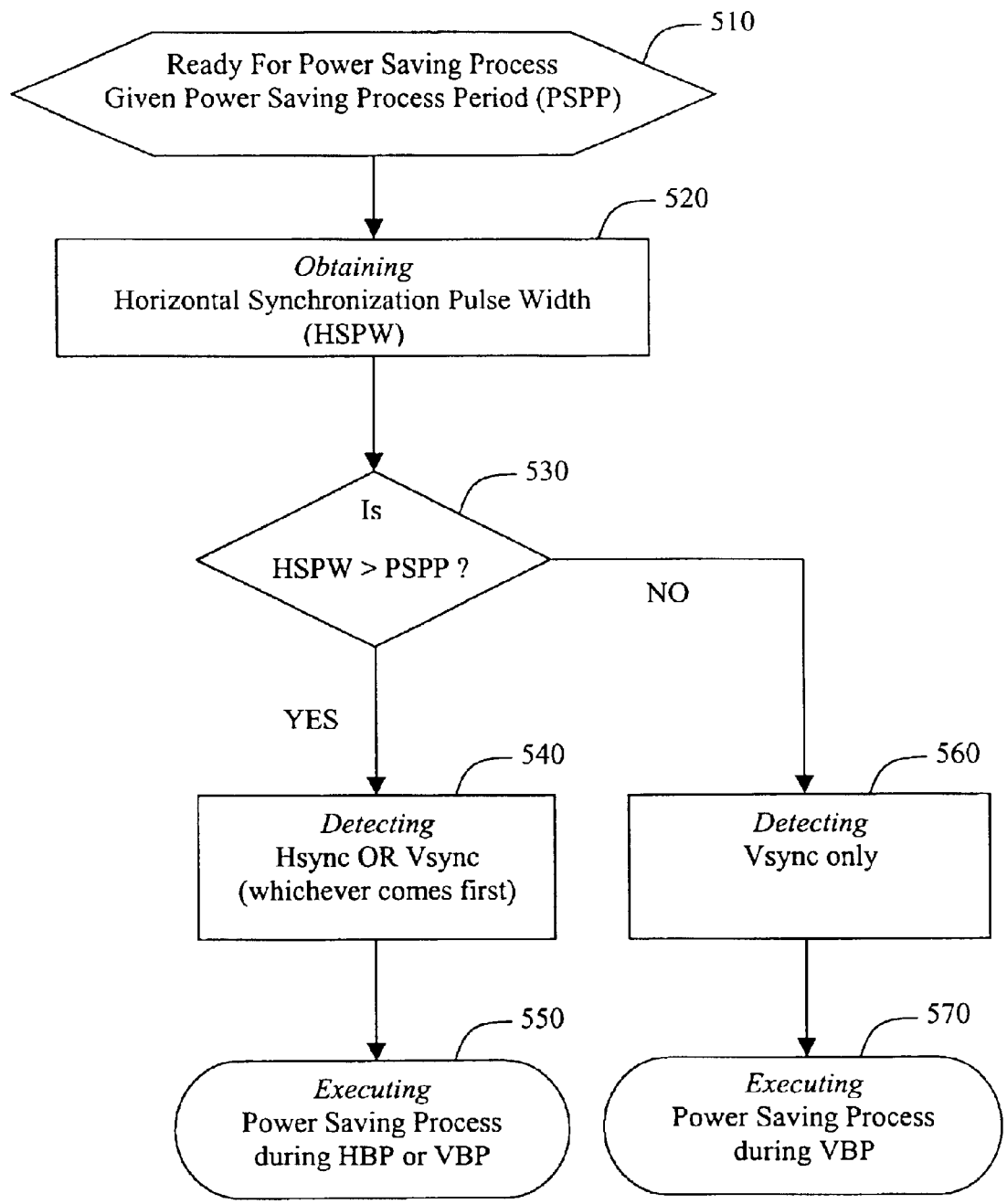
FIG. 5 graphically depicts a flow chart showing the operation of a preferred embodiment of the present invention.

Nevertheless, the present invention shouldn't be restricted to the computer system architectures of FIGS. 3 and 4 or the like, but is applicable to any computer systems having the system memory directly coupled to the processor through a built-in memory controller inside the processor. FIG. 5 graphically depicts a flow chart showing the operation of a preferred embodiment of the present invention, an uninterrupted data display method for a computer system having a system memory directly coupled to a processor, for preventing disrupted data display from transmission break, before the processor goes into a non-responding period due to an execution of an economical process. The economical process can be any process that makes the processor not respond to any request, a power saving process which adjusts an operating frequency of the processor being an example. The time taken for executing such an economical process is fixed and known, and during that period, the processor is in an idle state and the interface between the processor and the north bridge is not responding, thus, a data transmission break exists between the graphics processing unit (or the graphics card) and the system memory. The uninterrupted data display method of the preferred embodiment of the present invention includes, in step 510, detecting an initiation of the economical process and knowing the process period. The initiation of the economical process is a request signal sent by the CPU for executing the economical process. In step 520, obtaining a horizontal synchronization pulse width (HSPW) from the graphics processing unit or from the graphics processor of the graphics card. In step 530, comparing the horizontal synchronization pulse width (HSPW) to the economical process period, if the horizontal synchronization pulse width (HSPW) is longer than the economical process period, then go to step 540, that is, detecting a horizontal synchronization pulse or a vertical synchronization pulse, whichever comes first, and, in step 550, execute the economical process during a horizontal blank period when the horizontal synchronization pulse is detected first, otherwise, a vertical blank period is used for executing the economical process if the vertical synchronization pulse is detected before the horizontal synchronization pulse. However, if the horizontal synchronization pulse width (HSPW) is not longer than the economical process period, then go to step 560, that is, detecting only the vertical synchronization pulse and once the vertical synchronization pulse is detected, execute the economical process straight away during the vertical blank period (step 570). The horizontal and vertical synchronization pulses are provided by the graphics processing unit (or the graphics card) and are used for synchronizing the display device to operate exactly synchronous to the graphics processing unit (or the graphics card), respectively during the horizontal and vertical blank period. Moreover, the graphics processing unit (or the graphics card) also provides two other signals, a horizontal blank pulse and a vertical blank pulse, which can be used to replace the above mentioned horizontal and vertical synchronization pulses respectively.

Figure 6:
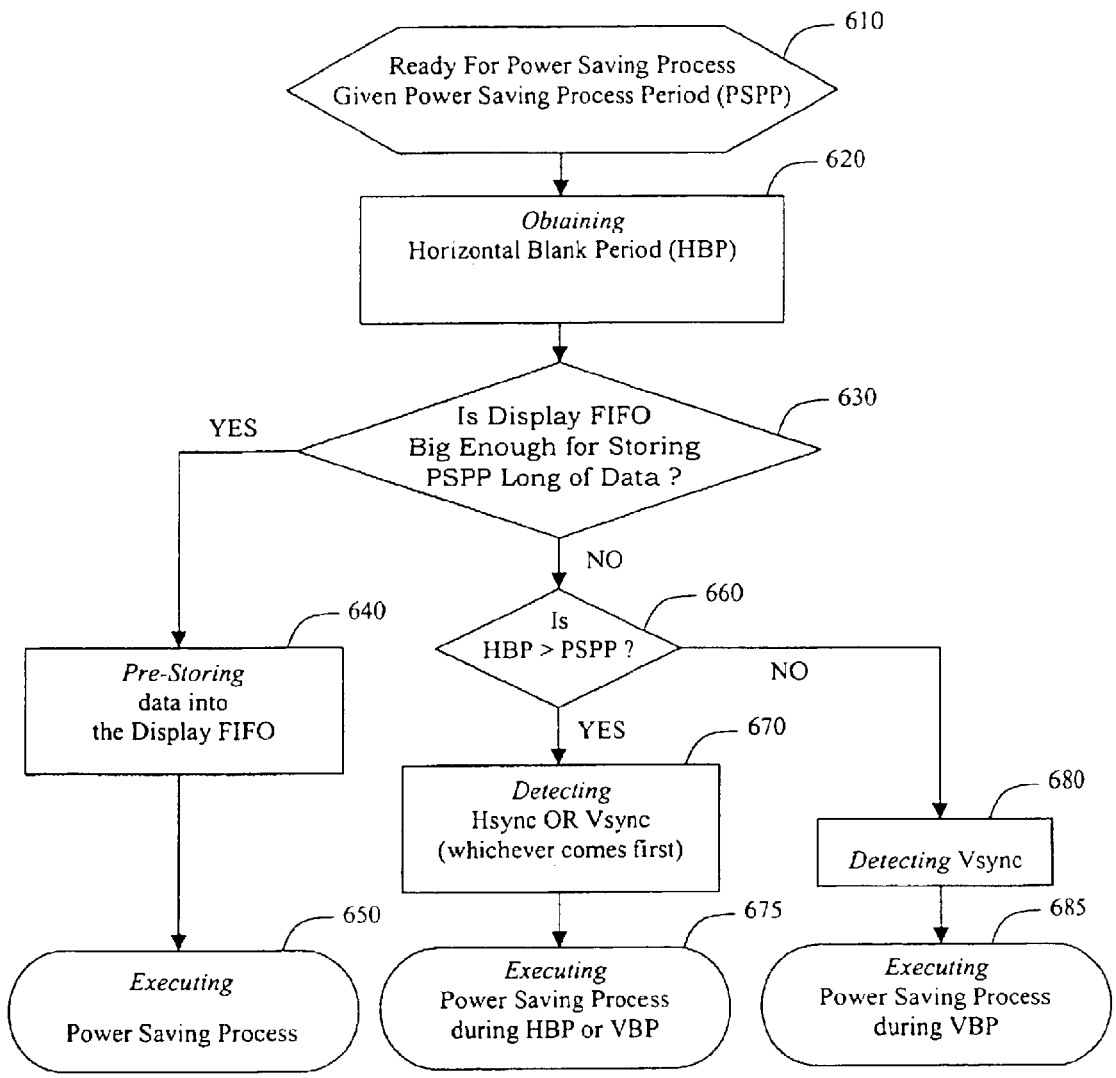
FIG. 6 graphically depicts a flow chart showing the operation of another preferred embodiment of the present invention.

FIG. 6 graphically depicts a flow chart showing the operation of another preferred embodiment of the present invention. An uninterrupted data display method for a computer system having a system memory directly coupled to a processor, for preventing disrupted data display from transmission break while the processor is non-responding, the uninterrupted data display method of the other preferred embodiment of the present invention includes, in step 610, detecting an initiation of a power saving process and having provided a power saving process period (PSPP). The initiation of the power saving process is a request signal sent by the CPU for executing the power saving process. The time taken (PSPP) for executing the power saving process is fixed and known, and during that period, the processor is in an idle state and the interface between the processor and the north bridge is not responding, thus, a data transmission break exists between the graphics processing unit (or the graphics card) and the system memory. Next, in step 620, obtaining a horizontal synchronization pulse width (HSPW) from the graphics processing unit or the graphics processor of the graphics card, as well as providing a data storage device having a depth for storing a period long of data. The data storage device of the present invention is a display FIFO, which is a video memory of the first-in-first-out (FIFO) type been described earlier. After knowing the depth of the display FIFO and the power saving process period (PSPP), a first comparison can be made, that is, in step 630, comparing the depth (data storage capacity in terms of period length) of the display FIFO to the power saving process period (PSPP). If the display FIFO is big enough for storing a PSPP long of data then move to step 640, that is pre-storing a PSPP long of data into the display FIFO, from the system memory, then, as in step 650, execute the power saving process after a PSPP long of data has been pre-stored.

If the display FIFO is too small to accommodate a PSPP long of data then go into a second comparison stage, in step 660, comparing the horizontal synchronization pulse width (HSPW) to the power saving process period (PSPP). If the horizontal synchronization pulse width (HSPW) is longer than the power saving process period (PSPP), then go to step 670, that is, detecting a horizontal synchronization pulse or a vertical synchronization pulse, whichever comes first, and, in step 675, execute the economical process during a horizontal blank period when the horizontal synchronization pulse is detected first, otherwise, a vertical blank period is used for executing the economical process if the vertical synchronization pulse is detected before the horizontal synchronization pulse. However, if the horizontal synchronization pulse width (HSPW) is not longer than the power saving process period (PSPP), then go to step 680, that is, detecting only the vertical synchronization pulse and once the vertical synchronization pulse is detected, executing the power saving process straight away during the vertical blank period (step 685). The horizontal and vertical synchronization pulses are provided by the graphics processing unit (or the graphics card) and are used for synchronizing the display device to operate exactly synchronous to the graphics processing unit (or the graphics card), respectively during the horizontal and vertical blank period. Moreover, the graphics processing unit (or the graphics card) also provides two other signals, a horizontal blank pulse and a vertical blank pulse, which can be used to replace the above mentioned horizontal and vertical synchronization pulses respectively.

Of course it will be obvious to those of ordinary skill in the relevant art, after study of the description set forth above in conjunction with the drawings, that principles, features and methods of operation of the described computer system with display and methods may be readily applied to other systems and devices, including but not limited to intelligent devices incorporating a display, embedded micro-controllers incorporating a user display, and intelligent input/output processing mechanisms including a display.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An uninterrupted data display method for a computer system having a system memory directly accessed by a processor, for preventing disrupted data display from transmission break, before the processor goes into a non-responding period due to an execution of an economical process, said method comprising the steps of:
    a. comparing said non-responding period to a horizontal synchronization pulse width, if said non-responding period is shorter than said horizontal synchronization pulse width, jump to step b, otherwise, to step c;
    b. detecting said horizontal synchronization pulse or a vertical synchronization pulse, whichever comes first, then jump to step d which is being executed within a horizontal blank period when said horizontal synchronization pulse is detected first, otherwise, a vertical blank period is used for step d if said vertical synchronization pulse is detected prior to said horizontal synchronization pulse;
    c. detecting only said vertical synchronization pulse, then jump to step d, and said vertical blank period is used for step d once said vertical synchronization pulse is detected; and
    d. executing said economical process.

2. The method according to claim 1 further comprises the following steps before step a:
    i. providing a data storage device having a depth for storing a period long of data;
    ii. comparing said period of said depth to said non-responding period, if said period of said depth is longer than said non-responding period, jump to step iii, otherwise, to step a; and
    iii. loading said period long of data from said system memory into said data storage device then jump to step d.

3. The method according to claim 2, wherein said data storage device is a graphics display FIFO.

4. The method according to claim 1, wherein said economical process is a power saving process which may adjust an operating frequency of said processor.

5. The method according to claim 1, wherein said horizontal and vertical synchronization pulses are provided by a graphics processing unit and are used for synchronizing a display device to operate exactly synchronous to said graphics processing unit, respectively during said horizontal and vertical blank period.

6. The method according to claim 5, wherein said horizontal synchronization pulse can be replaced by a horizontal blank pulse which is also provided by said graphics processing unit.

7. The method according to claim 5, wherein said vertical synchronization pulse can be replaced by a vertical blank pulse which is also provided by said graphics processing unit.

8. An uninterrupted data display method for a computer system having a system memory directly accessed by a processor, for preventing disrupted data display from transmission break, before the processor goes into a non-responding period due to an execution of an economical process, said method comprising the steps of:
    a. providing a data storage device having a depth for storing a period long of data;
    b. comparing said period of said depth to said non-responding period, if said period of said depth is longer than said non-responding period, jump to step c, otherwise, to step d;
    c. loading said period long of data from said system memory into said data storage device then jump to step e;
    d. detecting a non-display pulse then jump to step e, wherein step e is to be accomplished within a non-display period; and
    e. executing said economical process.

9. The method according to claim 8, wherein said non-display period a horizontal blank period.

10. The method according to claim 9, wherein said non-display pulse is a horizontal synchronization pulse (Hsync) which is used for synchronizing a display device to operate exactly synchronous to a graphics processing unit during said horizontal blank period.

11. The method according to claim 9, wherein said non-display pulse is a horizontal blank pulse (Hblank) provided by a graphics processing unit.

12. The method according to claim 8, wherein said non-display period is a vertical blank period.

13. The method according to claim 12, wherein said non-display pulse is a vertical synchronization pulse (Vsync) which is used for synchronizing a display device to operate exactly synchronous to a graphics processing unit during said vertical blank period.

14. The method according to claim 12, wherein said non-display pulse is a vertical blank pulse (Vblank) provided by a graphics processing unit.

15. The method according to claim 8, wherein said data storage device is a graphics display FIFO.

16. The method according to claim 8, wherein said economical process is a power saving process which may adjust an operating frequency of said processor.

17. An uninterrupted data display method for a computer system having a system memory directly accessed by a processor, for preventing disrupted data display from transmission break while the processor is non-responding, said method comprising the steps of:

a. detecting an initiation of a power saving process;

b. obtaining a first length of time required for executing said power saving process and a second length of time of a horizontal synchronization pulse;

c. providing a data storage device having a depth for storing a third length of time long of data;

d. comparing said third length of time to said first length of time, if said third length of time is longer than said first length of time, jump to step e, otherwise, to step f;

e. loading said first length of time long of data from said system memory into said data storage device then jump to step i;

f. comparing said second length of time to said first length of time, if said second length of time is longer than said first length of time, jump to step g, otherwise, to step h;

g. detecting said horizontal synchronization pulse or a vertical synchronization pulse, whichever comes first, then jump to step i which is being executed within a horizontal blank period when said horizontal synchronization pulse is detected first, otherwise, a vertical blank period is used for step i if said vertical synchronization pulse is detected prior said horizontal synchronization pulse;

h. detecting only said vertical synchronization pulse, then jump to step i, and said vertical blank period is used for step i once said vertical synchronization pulse is detected; and i. executing said power saving process.

18. The method according to claim 17, wherein said data storage device is a graphics display FIFO.

19. The method according to claim 17, wherein said horizontal and vertical synchronization pulses are provided by a graphics processing unit and are used for synchronizing a display device to operate exactly synchronous to said graphics processing unit, respectively during said horizontal and vertical blank period.

20. The method according to claim 19, wherein said horizontal synchronization pulse can be replaced by a horizontal blank pulse which is also provided by said graphics processing unit.

21. The method according to claim 19, wherein said vertical synchronization pulse can be replaced by a vertical blank pulse which is also provided by said graphics processing unit.

22. An uninterrupted data display method for preventing a processor's non-responding period from suspending a continuous data display, the method is often applied to a computer system in which its system memory is directly accessed by its processor, the uninterrupted data display method comprising:

detecting a request signal for executing a power saving process;

detecting a horizontal synchronization pulse or a vertical synchronization pulse, whichever comes first; and executing the power saving process at the start of a horizontal blank period if said horizontal synchronization pulse is detected first, otherwise at the start of a vertical blank period.

23. The uninterrupted data display method of claim 22, wherein the horizontal and vertical synchronization pulses are provided by a graphics processing unit, and the horizontal and vertical synchronization pulses are used for synchronizing a display device during the horizontal and vertical blank periods to operate synchronously.

24. The uninterrupted data display method of claim 23, wherein the horizontal synchronization pulse can be replaced by a horizontal blank pulse that is also provided by the graphics processing unit.

25. The uninterrupted data display method of claim 23, wherein the vertical synchronization pulse can be replaced by a vertical blank pulse that is also provided by the graphics processing unit.

* * * * *